(12) United States Patent
Tillman et al.

(10) Patent No.: US 9,300,395 B2
(45) Date of Patent: Mar. 29, 2016

(54) METHOD AND APPARATUS FOR CARRIER AGGREGATION

(75) Inventors: Fredrik Tillman, Lund (SE); Christian Bergljung, Lund (SE); Bengt Lindoff, Bjärred (SE); Stefan Parkvall, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 591 days.

(21) Appl. No.: 13/542,359

(22) Filed: Jul. 5, 2012

(65) Prior Publication Data

US 2014/0010125 A1    Jan. 9, 2014

(51) Int. Cl.
*H04L 5/14* (2006.01)
*H04B 7/26* (2006.01)
*H04L 5/00* (2006.01)

(52) U.S. Cl.
CPC .............. *H04B 7/2643* (2013.01); *H04L 5/001* (2013.01); *H04L 5/1469* (2013.01); *H04L 5/0094* (2013.01)

(58) Field of Classification Search
CPC ... H04L 5/14; H04L 5/1438; H04W 52/0235; H04W 72/0406; H04W 72/082
See application file for complete search history.

(56) References Cited

U.S. PATENT DOCUMENTS

| | | | | |
|---|---|---|---|---|
| 5,515,365 | A * | 5/1996 | Sumner et al. | 370/278 |
| 6,134,227 | A * | 10/2000 | Magana | 370/330 |
| 6,671,496 | B1 * | 12/2003 | Hoshi | 455/78 |
| 8,582,527 | B2 * | 11/2013 | Dinan | 370/330 |
| 2010/0182939 | A1 * | 7/2010 | Ojala et al. | 370/280 |
| 2011/0044259 | A1 * | 2/2011 | Nimbalker et al. | 370/329 |
| 2011/0103327 | A1 * | 5/2011 | Lee et al. | 370/329 |
| 2011/0103328 | A1 * | 5/2011 | Lee et al. | 370/329 |
| 2011/0211503 | A1 * | 9/2011 | Che et al. | 370/280 |

(Continued)

FOREIGN PATENT DOCUMENTS

| | | |
|---|---|---|
| CN | 102378185 A | 3/2012 |
| EP | 2385716 A2 | 11/2011 |

(Continued)

OTHER PUBLICATIONS

Haas, et al., "A Capacity Investigation on UTRA-TDD Utilising Underused UTRA-FDD Uplink Resources," IEE. The Institution of Electrical Engineers, 1999, pp. 1-6. Savoy Place, London, UK.

(Continued)

*Primary Examiner* — Hassan Phillips
*Assistant Examiner* — Prenell Jones
(74) *Attorney, Agent, or Firm* — Murphy, Bilak & Homiller, PLLC

(57) ABSTRACT

The teachings herein provide a number of advantages, including but not limited to improving soft-cell operation in service scenarios involving legacy devices that do not directly support carrier aggregation—i.e., devices that can transmit or receive in only one frequency band at a time. By imposing a Time Division Duplex (TDD) arrangement across two carriers operating in different frequency bands, scheduled transmissions involving the legacy device are mutually exclusive as between the two carriers. Advantageously, the TDD arrangement is imposed across first and second carriers used in the macro- and low-power layers of a soft-cell, thus imposing TDD-based coordination of scheduled transmissions between those carriers irrespective of whether the individual carriers are configured as Frequency Division Duplex (FDD) or TDD carriers, or a mix thereof.

24 Claims, 8 Drawing Sheets

(56) References Cited

U.S. PATENT DOCUMENTS

| | | |
|---|---|---|
| 2011/0249641 A1* | 10/2011 | Kwon et al. ............ 370/329 |
| 2011/0268001 A1* | 11/2011 | Lee et al. .............. 370/311 |
| 2012/0063373 A1 | 3/2012 | Chincholi et al. |
| 2012/0230272 A1* | 9/2012 | Kim et al. ............. 370/329 |
| 2012/0236736 A1* | 9/2012 | Frank et al. ........... 370/252 |
| 2012/0314652 A1* | 12/2012 | Ahn et al. ............. 370/328 |
| 2013/0044651 A1* | 2/2013 | Wang et al. ............ 370/280 |
| 2013/0114480 A1* | 5/2013 | Chapman et al. ........ 370/282 |
| 2013/0136109 A1* | 5/2013 | Cheng et al. ........... 370/336 |
| 2013/0190006 A1* | 7/2013 | Kazmi et al. ........... 455/456.1 |
| 2013/0242812 A1* | 9/2013 | Khoryaev et al. ........ 370/278 |
| 2013/0242881 A1* | 9/2013 | Wang et al. ............ 370/329 |

FOREIGN PATENT DOCUMENTS

| | | |
|---|---|---|
| WO | 0007399 A1 | 2/2000 |
| WO | 2010/141913 A2 | 12/2010 |
| WO | 2011/127435 A1 | 10/2011 |
| WO | 2012/002855 A1 | 1/2012 |

OTHER PUBLICATIONS

Parkvall, S. et al. "Heterogeneous Network Deployments in LTE." Ericsson Review, The Soft Cell Approach, Dec. 28, 2011, pp. 1-5, Issue 2.

Gan, J. "Soft Cell—A Hetnet Solution for IMT-Advanced and Beyond." Ericsson Research, Nov. 8, 2011.

Parkvall, S. et al. "Heterogeneous Network Deployments in LTE." Ericsson Review, Feb. 2011.

3rd Generation Partnership Project. "Inter-cell CSI-RS Analysis." 3GPP TSG RAN WG1 meeting #59bis, R1-100248, Valencia, Spain, Jan. 18-22, 2009.

* cited by examiner

METHOD AND APPARATUS FOR CARRIER AGGREGATION

TECHNICAL FIELD

The present invention generally relates to wireless communication networks and particularly relates to carrier aggregation.

BACKGROUND

With carrier aggregation, multiple carriers are used together, to provide service to a node, e.g., a wireless communication device. That is, two or more separate radio carriers are "collected" together in some functional or operational sense. The manner of aggregation and the underlying operational details vary according to the type of radio network and/or services involved. In networks based on LTE or LTE-Advanced, which is a progression of the Long Term Evolution (LTE) standard, carrier aggregation increases the available transmission bandwidth.

The bandwidth increase comes from using multiple carriers concurrently for data transmission, which effectively increases the transmission bandwidth in LTE beyond the maximum single-carrier bandwidth of 20 MHz. The multiple carriers may be contiguous within a larger spectrum, or they may be non-contiguous, where component carriers from different spectrum bands are aggregated. The former case is referred to as "intra-band" aggregation while the latter case is referred to as "inter-band" aggregation.

The "flexible cell" concept introduced by ERICSSON AB provides another example of carrier aggregation. The concept relies on "soft-cell" operation in a heterogeneous ("HetNet") network context where a wider-area, macro coverage area overlays one or more smaller coverage areas provided by respective low-power nodes. The low-power nodes can be understood as improving radio coverage and/or providing the opportunity for higher-rate data service for devices operating within their coverage areas.

In some HetNet deployments, a macro node provides a macro cell that overlays one or more low-power cells provided by corresponding low-power nodes positioned within the macro coverage area. The macro and low-power cells operate as separate cells, each associated with a unique cell identifier within the network. Contrastingly, in a HetNet configured according to the soft-cell concept, a low-power cell and its overlaid macro cell share the same cell identifier. This arrangement exploits the difference between a "cell" and a "transmission point."

Cell-specific references signals (CRS) functionally depend on unique cell identifiers within the network, and allow devices operating within the network to demodulate cell-specific control and synchronization information, as needed for network access. In contrast, a transmission point simply represents an antenna or antenna element from which a device can receive data transmissions within the "cell." Demodulation-specific Reference Signals (DMRS) transmitted from each data transmission point within the cell enables the receiving device to determine the channel and precoding associated with the transmission.

Thus, in the soft-cell context, the macro cell and the low-power cell function as a "shared" cell, with the macro node and the low-power node representing different transmission points within the shared cell. This arrangement allows, for example, a division between the transmission of certain system information and user-plane data. Namely, the macro layer provided by the macro node is used for broadcasting certain system information to devices operating within the broader coverage area represented by the shared cell, while the low-power layer provided by the low-power node is used for high-rate data service to one or more devices operating within the low-power coverage area overlaid by the macro-layer coverage area. For further soft-cell details, see "Heterogeneous network deployments in LTE," Parkvall, et al., Ericsson Review (February 2011), which discusses the use of frequency division for resource partitioning and Almost Blank Subframe (ABS) signaling, for devices having multi-frequency carrier aggregation capabilities.

The above soft-cell arrangement decouples system information and the control plane from user data. In the simplest implementation, control plane transmissions by the macro node and user data transmissions by the low-power node use the same carrier frequency and are "separated" in the soft-cell context only in terms of which node is involved in the transmission. With spectrum optimization, however, the control information is transmitted in a first frequency band by the macro node, and user data is transmitted in a second frequency band by the low-power node(s). Example frequency bands used in cellular radio networks include the 800 MHz, 900 MHz, 1800 MHz, and 1900 MHz bands.

Spectrum optimization comes at the expense of complexity, as the use of different frequency bands obligates devices within the soft-cell to maintain concurrent communications in both frequency bands. The requirement to maintain concurrent communications in multiple frequency bands obligates the device to have additional or more complex radio transceiver circuitry. This requirement harmonizes with the general trend toward the use of carrier aggregation, which necessarily requires compatible devices to support concurrent operations across more than one frequency band, but it presents problems in the case of "legacy" devices that were designed for operation in only one frequency band at a time.

A known accommodation addresses the legacy-device problem with the introduction of measurement gaps in the data transmissions. These gaps, e.g., 6 ms gaps every 40-100 ms, are not useful for data transmissions, especially because of the attendant retransmission timing and latency issues, but they do allow legacy devices time to monitor the macro-layer for small amounts of control signaling. Such monitoring interrupts data transmission on the low-power layer, however. With gap periodicity ranging from 40-100 ms, the use of measurement gaps meaningfully reduces data throughput on the low-power layer.

SUMMARY

The teachings herein provide a number of advantages, including but not limited to improving soft-cell operation in service scenarios involving legacy devices that do not directly support carrier aggregation—i.e., devices that can transmit or receive on only one frequency at a time. By imposing a Time Division Duplex (TDD) arrangement across two carriers operating in different frequency bands, scheduled transmissions involving the legacy device are mutually exclusive as between the two carriers. Advantageously, the TDD arrangement is imposed across first and second carriers used in the macro- and low-power layers of a soft-cell, thus imposing TDD-based coordination of scheduled transmissions between those carriers irrespective of whether the individual carriers are configured as Frequency Division Duplex (FDD) or TDD carriers, or a mix thereof.

In one example, a method of allowing synchronized first and second carriers operating in respective first and second frequency bands to share in time the transceiver of a wireless communication device includes determining a TDD arrangement for the two carriers. Here, determining the TDD arrangement includes making complementary allocations of time between the two carriers, so that scheduled transmissions to or from the wireless communication device are mutually exclusive in time as between the two carriers. Correspondingly, the method further includes sending allocation information indicating the TDD arrangement to the wireless communication device and/or a network node responsible for scheduling uplink and downlink transmissions on at least one of the two carriers.

The method as applied to the soft-cell context imposes a TDD arrangement between the macro-layer carrier and the low-power layer carrier, where some frames within a given interval are allocated for use by the macro node in scheduling transmissions to or from the device on the macro layer, and other frames within the interval are allocated for use by the low-power node in scheduling transmissions to or from the device on the low-power layer. The macro node may be configured to decide the TDD arrangement and communicate corresponding details to the low-power node. Alternatively, the low-power node is configured to decide the TDD arrangement and communicate details to the macro node. As a further alternative, the two nodes are configured to cooperatively decide the TDD arrangement or a centralized node is configured to decide the TDD arrangement.

An example network node comprises one or more communication interfaces and an allocation processing circuit operatively associated with the one or more communication interfaces. The allocation processing circuit is configured to allow synchronized first and second carriers operating in respective first and second frequency bands to share in time the transceiver of a wireless communication device.

In this regard, the allocation processing circuit is configured to determine TDD arrangement for the two carriers by making complementary allocations of time between the two carriers. The TDD arrangement thus means that transmissions to or from the wireless communication device are mutually exclusive in time as between the two carriers, irrespective of whether the carriers are both FDD or TDD, or a mix thereof. The allocation processing circuit is further configured—e.g., via the one or more communication interfaces—to send allocation information indicating the TDD arrangement to the wireless communication device and/or a network node responsible for scheduling uplink and downlink transmissions on at least one of the two carriers.

In a corresponding example configuration, a wireless communication device includes a communication transceiver configured for FDD operation and one or more processing circuits that are operatively associated with the communication transceiver and configured to receive allocation information from the network indicating a TDD arrangement to be used for providing service to the wireless communication device on (synchronized) first and second carriers operating in first and second frequency bands, respectively. In particular, the TDD arrangement indicates complementary allocations of time between the two carriers, so that scheduled transmissions to or from the wireless communication device are mutually exclusive in time as between the two carriers.

Based on this knowledge, the device's processing circuits are configured to operate the communication transceiver in alternation between the first and second frequency bands in accordance with the indicated TDD arrangement. Consequently, the device communicates with the wireless communication network on both carriers using the same communication transceiver. In this context, using the "same" communication transceiver connotes reuse of the same transmit and/or receive chain, tuned to one carrier at a time, as compared to more complex transceivers that can be concurrently tuned to multiple frequency bands for concurrent operation in two or more different frequency bands.

A corresponding example method at a wireless communication device includes receiving allocation information from a wireless communication network indicating a TDD arrangement to be used for providing service to the device on (synchronized) first and second carriers operating in first and second frequency bands, respectively. As before, the TDD arrangement indicates complementary allocations of time between the two carriers, so that scheduled transmissions to or from the wireless communication device are mutually exclusive in time as between the two carriers. Correspondingly, the method includes operating the communication transceiver in alternation between the first and second frequency bands in accordance with the indicated TDD arrangement. Consequently, the method allows the same transceiver, tuned to one frequency band at a time, to be used for time-alternating communications on the two carriers.

The above example methods and apparatuses, both on the network-side and on the device-side, provide TDD-based carrier aggregation and allow a legacy device that can tune to only one frequency band at a time to operate within a HetNet environment, where a macro cell uses a first frequency band, and a low-power cell overlaid by the macro cell uses a second frequency band. Of course, the present invention is not limited to such features and advantages. Indeed, those skilled in the art will recognize additional features and advantages upon reading the following detailed description, and upon viewing the accompanying drawings.

DETAILED DESCRIPTION

Figure 1:
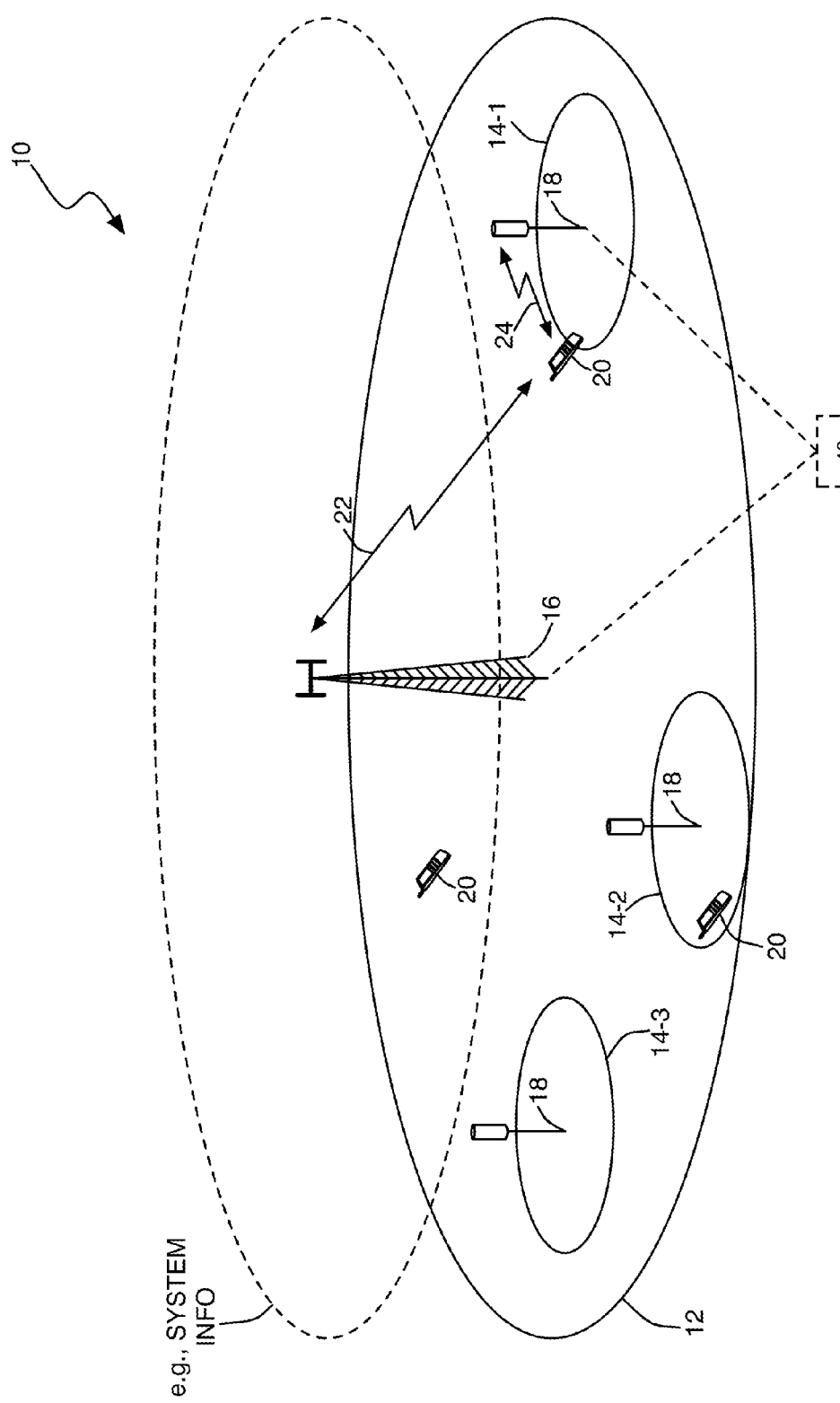
FIG. 1 is a partial block diagram of one embodiment of a wireless communication network configured for carrier aggregation as taught herein.

FIG. 1 illustrates an example wireless communication network 10. The network 10 is configured as a heterogeneous network ("HetNet") having one or more macro cells 12 that overlay one or more low-power cells 14, shown here as low-power cells 14-1, 14-2, and 14-3. For brevity, these low-power cells 14 are hereafter referred to as "pico cells 14," to denote their smaller coverage areas as compared to the macro coverage area provided by the macro cell 12. "Pico" in this sense generically covers different types of low-power nodes, including, without limitation, home eNBs and other residential or private base stations, femto base stations, relay nodes, repeaters, etc.

With this terminology, a macro base station 16 controls the macro cell 12 and respective pico base stations 18 control the pico cells 14-1, 14-2, and 14-3. Correspondingly, one sees an example number of wireless communication devices 20 ("devices 20" or "device 20") operating within the macro-cell and/or pico-cell coverage areas. In an example case, one sees a device 20 located such that is connected to the macro cell 12 by a first carrier 22 and connected to the pico cell 14-1 by a second carrier 24. Unless otherwise noted, the term "carrier" refers to an uplink and downlink operating at a single frequency with Time Division Duplex (TDD) alternation between uplink and downlink transmissions, or an uplink and downlink operating with Frequency Division Duplex (FDD), where concurrent uplink and downlink transmissions can occur but at offset frequencies within a single frequency band.

In some embodiments, the network 10 operates in a softcell configuration, wherein the macro cell 12 and the pico cells 14 share the same cell identifier within the network 10, effectively making them operate as separate transmission points within a shared cell. Further, in at least one such embodiment, the macro cell 12 is used, at least primarily, for transmitting control-plane signaling such as system information (SI), while the pico cells 14 are used, at least primarily, for transmitting user data.

Figure 2:
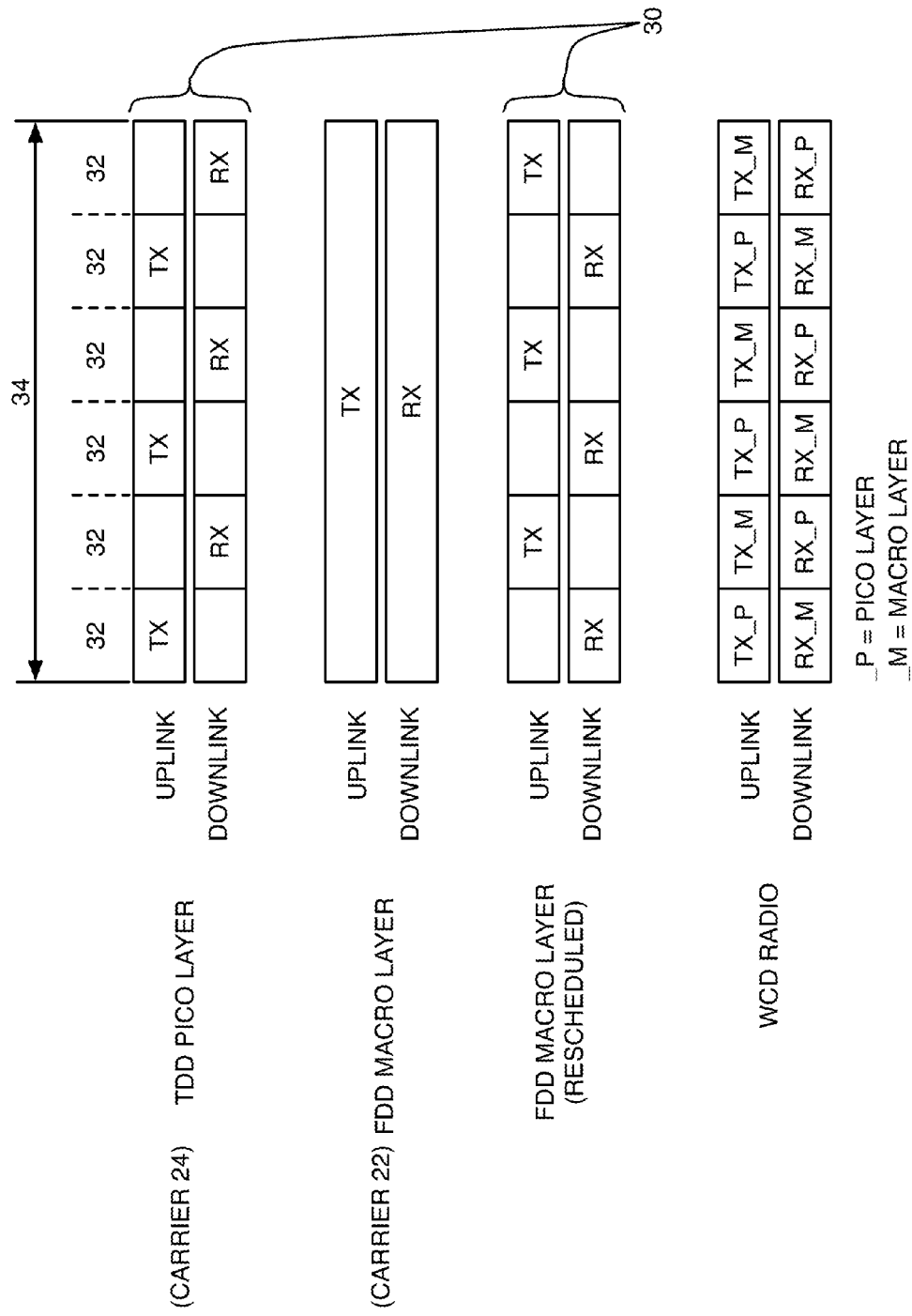
FIG. 2 is a diagram of an example Time Division Duplex (TDD) arrangement as determined for TDD-based aggregation of first and second carriers operating in first and second frequency bands, respectively.
Figure 3:
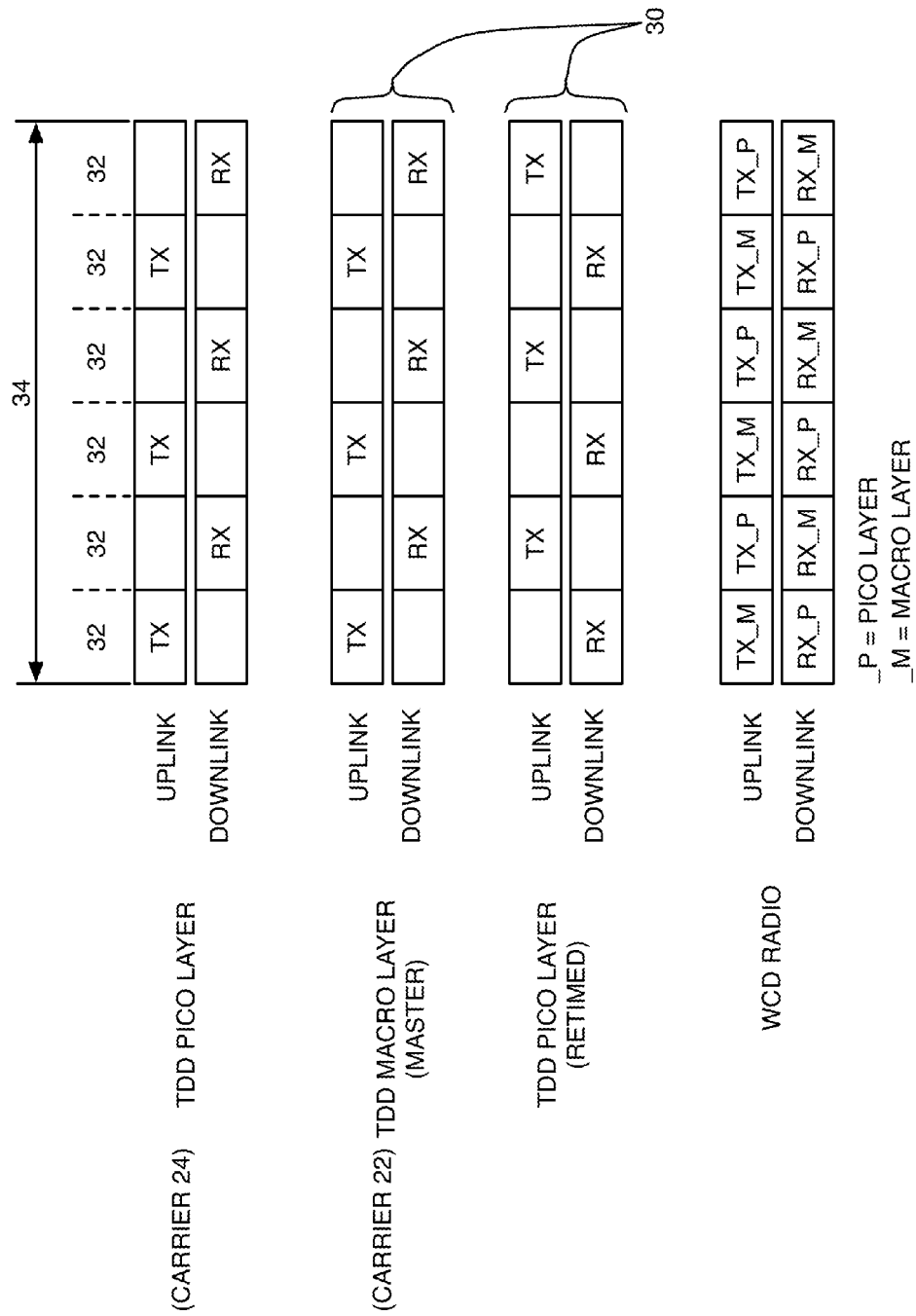
FIG. 3 is a diagram of another example of TDD-based carrier aggregation.

In a conventional HetNet implementation, the device 20 would be obligated to concurrently tune its wireless transceiver to two different frequency bands, at least where the first and second carriers 22, 24 are in different frequency bands. The use of two different frequency bands is assumed here. The teachings herein advantageously impose a TDD arrangement 30 (as shown in the examples of FIGS. 2 and 3) across the two carriers 22, 24, where a set of frames (or any other defined scheduling intervals) over some defined interval of time are allocated in mutually exclusive subsets to the first and second carriers 22, 24, for use in making scheduled transmissions to or from the device 20. The "exclusivity" is between transmissions on the two carriers 22, 24 in the same direction. That is, the mutually exclusive allocations prevent concurrent downlink transmissions to the device 20 from being scheduled on the two carriers 22, 24, and prevent concurrent uplink transmissions from the device 20 from being scheduled on the two carriers 22, 24.

In this regard, the TDD arrangement 30 can be understood as an allocation scheme or pattern that is imposed on the nodes responsible for scheduling transmissions to or from the device 20 in the involved macro cell 12 and pico cell 14. The TDD arrangement 30 dictates to those involved nodes which frames can be used at each node for scheduling transmissions to or from the device 20. Consequently, the device 20 need only tune its receiver to one frequency band at a time, as scheduled downlink transmissions to the device 20 occur on only one carrier 22 or 24 at a time. Likewise, as a consequence of the TDD arrangement 30 imposed at the nodes handling scheduling on the two carriers 22, 24, the device 20 need only tune its transmitter to one frequency band at a time, as the scheduled uplink transmissions to the device occur on only one carrier 22 or 24 at a time. Assuming that the device 20 in question is a legacy device that cannot concurrently operate on multiple frequency bands, imposition of the TDD arrangement 30 thus allows the device 20 to operate with a TDD-based form of carrier aggregation in the HetNet context.

In more detail, FIG. 2 illustrates an example TDD arrangement 30 imposed across the first and second carriers 22 and 24, where the first carrier 22 is a FDD carrier having concurrent uplink and downlink transmission times and the second carrier 24 is a TDD carrier having alternating and non-overlapping transmit and receive times for the uplink and downlink. Note that "WCD" indicates "wireless communication device" in the diagram.

The TDD arrangement 30 imposes complementary allocations of time between the two carriers 22, 24, so that scheduled transmissions to or from the wireless communication device 20 are mutually exclusive in time as between the two carriers 22, 24. These complementary allocations of time mean that only one carrier 22 or 24 at a time can be scheduled for a downlink transmission to the device 20 within a given "frame" 32, and likewise that only one carrier 22 or 24 at a time can be scheduled for an uplink transmission from the device 20.

One may assume that the device 20 has a multiband transceiver that is intended for use in one frequency band at a time, but that it allows its receiver to be tuned to one frequency band while its transmitter is tuned to another frequency band. In FIG. 2, the TDD arrangement 30 exploits that capability to maximize throughput and avoid time-wasting gaps, by allocating the downlink direction in each frame 32 to one of the two carriers 22 or 24, while allocating the uplink direction in the same frame 32 to the other one of the two carriers 22 or 24.

One sees this allocation pattern for the "WCD Radio" at the bottom of FIG. 2, where "TX_P" denotes a frame 32 that has been allocated for use as needed in making a scheduled uplink transmission from the device 20 on the pico layer. Similarly, "RX_P" denotes a frame 32 that has been allocated for use as needed in making a scheduled downlink transmission to the device 20 on the pico layer. In the same vein, "TX_M" denotes a frame 32 that has been allocated for use as needed in making a scheduled uplink transmission from the device 20 on the macro layer. Similarly, "RX_M" denotes a frame 32 that has been allocated for use as needed in making a scheduled downlink transmission to the device 20 on the macro layer.

Notably, in FIG. 2 one also sees that imposition of the TDD arrangement 30 causes a "re-scheduling" for the carrier 22, which in this example is an FDD-based carrier. In particular, the FDD nature of the carrier 22 is transformed into a TDD structure that is time-coordinated with the carrier 24, in accordance with the TDD arrangement 30. However, the teachings herein are directly applicable to other cases, such as where the carrier 22 used in the macro layer and the carrier 24 used in the pico layer are both TDD-based carriers. See FIG. 3 for an example of this case, where the carrier 24 for the pico layer is re-scheduled or otherwise "re-timed" by imposition of the TDD arrangement 30. Again, one sees that the complementary allocations of time imposed by the TDD arrangement 30 make scheduled downlink transmissions to the device 20 mutually exclusive as between the two carriers 22 and 24, and make scheduled uplink transmissions from the device 20 mutually exclusive as between the two carriers 22 and 24.

The TDD arrangement 30 in this sense can be understood as allocation data embodying the mutually exclusive allocations of downlink and uplink transmission times between the two carriers 22 and 24. As such, the TDD arrangement 30 can be signaled as allocation information, sent from the node(s) that decide the TDD arrangement to the device 20 and/or to any other node(s) involved in the scheduling of either or both carriers 22, 24.

Figure 4:
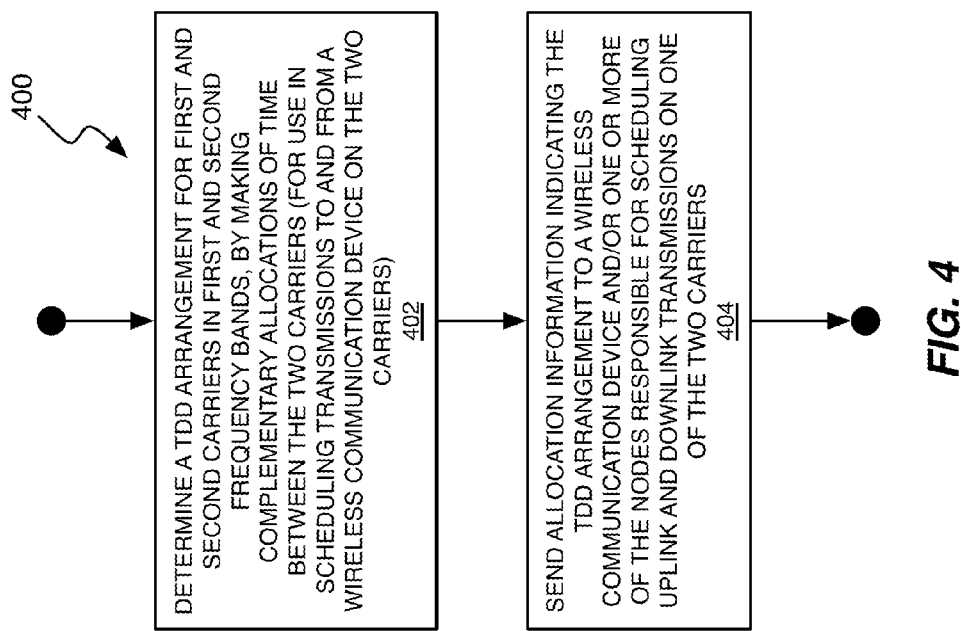
FIG. 4 is a logic flow diagram of one embodiment of a method of carrier aggregation processing, such as may be practiced in a centralized node, or in one of the base stations involved in serving a wireless communication device via the aggregated carriers.

With these examples in mind, FIG. 4 illustrates an example method 400 that allows synchronized first and second carriers 22, 24 operating in respective first and second frequency bands to "share" in time the transceiver of a device 20. The method 400 thus allows the device 20 to communicate on both carriers 22, 24 in TDD fashion.

The method 400 includes determining a TDD arrangement for the two carriers 22, 24 by making complementary allocations of time between the two carriers 22, 24, so that scheduled transmissions to or from the device 20 are mutually exclusive in time as between the two carriers 22, 24 (Block 402), and further includes sending allocation information indicating the TDD arrangement 30 to the device 20 and/or another network node that is responsible for scheduling uplink and downlink transmissions on at least one of the two carriers 22, 24 (Block 404).

The method 400 may be carried out for each device 20 that is being served by a given pair of macro and pico cells 12, 14 in the network 10. However, the same TDD arrangement 30 can be used for more than one device 20, because a given TDD arrangement 30 does not represent actual scheduling decisions for a target device 20, but rather represents the allocation of times permissible for scheduling transmissions to or from that device 20. In that regard, the restrictions imposed by the TDD arrangement(s) 30 pertaining to multiple devices 20 operating within a given pair of macro and pico cells 12, 14 represent another set of variables input to the ongoing scheduling processes governing scheduled transmissions in those cells.

Thus, for a given TDD arrangement 30 as applied to a given device 20, the method 400 may further comprises scheduling downlink and uplink transmissions to and from the wireless communication device 20 on the first or second carrier 22 or 24 only at times allocated to the first or second carrier 22 or 24 under the TDD arrangement 30. This extension of the method 400 applies, for example, where the TDD arrangement 30 is decided in a node that is responsible for scheduling transmissions on one or both of the carriers 22 and 24.

The method 400 also may include performing the steps of determining (Block 402) and sending (Block 404) in each of a series of successive allocation windows 34. As explained in the context of FIGS. 2 and 3, each allocation window 34 spans a number of frames 32, so that the division of frames 32 between the first and second carriers is dynamically updated over the successive allocation windows 34 in response to changing service requirements for the wireless communication device 20 on the first and second carriers 22 and 24. In this context, "dividing" the frames 32 within a given allocation window 34 between the first and second carriers 22 and 24 can be understood as making mutually exclusive downlink and uplink divisions—e.g., any given frame 32 is allocated in the downlink direction to only one of the carriers 22 and 24, and any given frame 32 is allocated in the uplink direction to only one of the carriers 22 and 24. However, it may be that the same frame 32 is allocated to the same carrier 22 or 24 in the downlink and uplink directions, or it may be that the same frame 32 is allocated in the downlink direction to one of the two carriers 22 or 24 and is allocated in the uplink direction to the other one of the two carriers 22 or 24.

The particular allocation pattern depends, for example, on the respective amounts of signaling or data to be sent over the two carriers 22 and 24. The TDD arrangement 30 may be structured to impose a desired load balancing between the two carriers 22 and 24, e.g., a load balancing between the macro layer downlink and the pico layer downlink. For example, in some embodiments, the first carrier 22 serves a macro cell 12 operating in a soft-cell arrangement with an under-laid pico cell 14 that is served by the second carrier 24. Here, the TDD arrangement 30 can be used to more heavily load the pico layer in the downlink and/or the uplink.

In any case, the method 400 is performed in one or both of a macro base station 16 corresponding to the macro cell 12 and a pico base station 18 corresponding to the pico cell 14. That is, either the macro base station 16 decides the TDD arrangement 30, or the pico base station 18 decides the TDD arrangement 30, or it is decided cooperatively between the macro and pico base stations 16 and 18. More generally, assuming that a first base station controls one of the two carriers 22 and 24 and decides the TDD arrangement 30, the method 400 includes the first base station sending signaling indicating the TDD arrangement 30 to a second base station that controls the other one of the two carriers 22 and 24.

Additionally, or alternatively, the allocation pattern may depend on whether the two carriers 22 and 24 are FDD-based, TDD-based, or mixed (one TDD, one FDD). FIG. 2, for example, showed an FDD-based version of the carrier 22 being rescheduled according to the TDD structure imposed by an example TDD arrangement 30, while FIG. 3 showed a TDD-based version of the carrier 24 being retimed according to another example TDD arrangement 30.

Regardless of which node or nodes in the network 10 decide the TDD arrangement 30, the TDD arrangement 30 may be determined as a function of relative service requirements for serving the device 20 on the first and second carriers 22 and 24. With this approach, the carrier 22 or 24 having higher service requirements for serving the device 20 receives a greater allocation of time as compared to the allocation of time given to the other carrier 22 or 24.

In this regard, FIGS. 2 and 3 should be understood as non-limiting examples—e.g., every tenth frame 32 may be allocated to one of the two carriers 22 and 24 in the downlink (or uplink) direction, while the remaining nine frames 32 are allocated to the other one of the two carriers 22 and 24. More broadly, one can view the TDD arrangement generation as deciding what fractions of the downlink and uplink-scheduling intervals within some window of time will be allocated to the first or second carrier 22 or 24, with the complementary remaining fractions being allocated to the other one of the first and second carriers 22 and 24.

Figure 5:
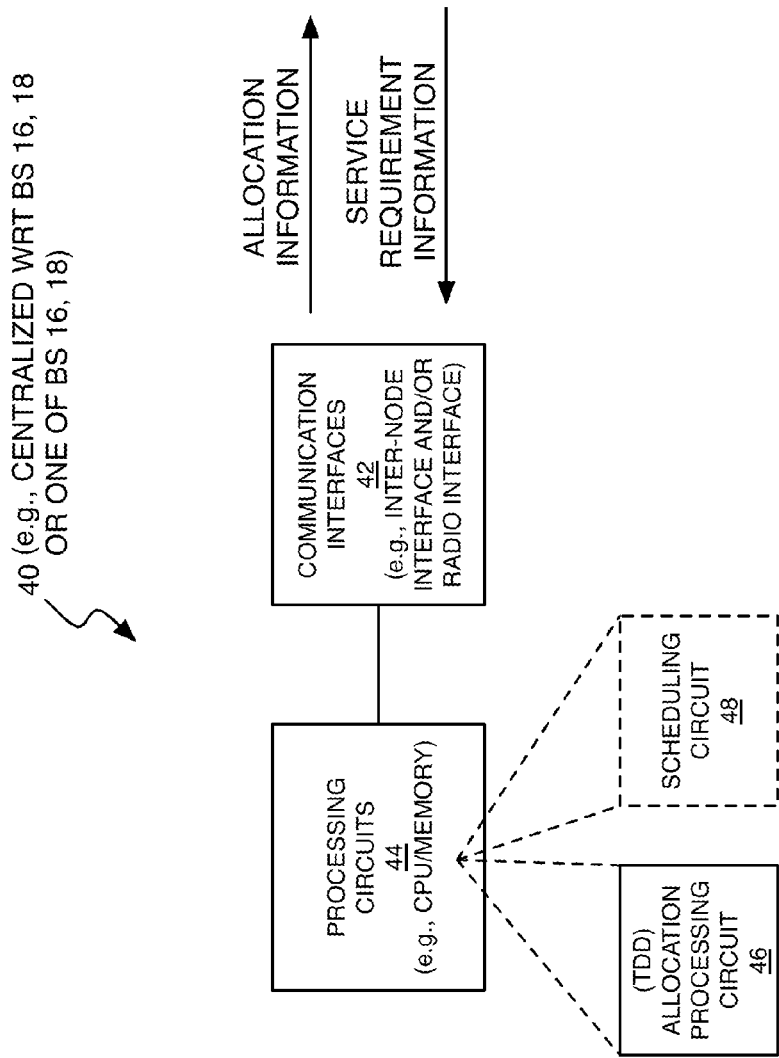
FIG. 5 is a block diagram of one embodiment of a network node configured to perform carrier aggregation processing.

FIG. 5 illustrates a node 40 that is configured to determine TDD arrangements 30 for any number of devices 20. Note that the node 40 is shown in FIG. 1 in dashed lines, indicating that it may be separate from the macro base station 16 and the pico base stations 18. For example, in at least one embodiment, the node 40 is centralized with respect to the macro and pico base stations 16 and 18.

Thus, the node 40 in a centralized example could decide the TDD arrangement 30 and signal that arrangement to the involved base stations, even though the node 40 does not perform scheduling on the involved carriers. However, it is also contemplated herein that the macro base station 16 is configured to operate as the node 40, or the pico base station 18 is configured to operate as the node 40. Further, the functionality could be distributed across the macro and pico base stations 16 and 18.

With these examples in mind, one sees that the node 40 includes one or more communication interfaces 42, and one or more processing circuits 44 that at least functionally include an allocation processing circuit 46 that is operatively associated with the one or more communication interfaces 42. The allocation processing circuit 46 is configured to allow synchronized first and second carriers 22 and 24 operating in respective first and second frequency bands to share in time the transceiver of a device 20. It will be appreciated that the one or more processing circuits 44 may comprise computer circuitry, e.g., one or more microprocessors-based circuits, DSP-based circuits, or other digital processing circuits.

The allocation processing circuit 46 is configured to: determine a TDD arrangement 40 for the two carriers 22 and 24, by making complementary allocations of time between the two carriers 22 and 24, so that scheduled transmissions to or from the wireless communication device 20 are mutually exclusive in time as between the two carriers 22 and 24; and send allocation information indicating the TDD arrangement 30 to at least one of the device 20 and a network node responsible for scheduling uplink and downlink transmissions on at least one of the two carriers 22 and 24. The allocations in question are complementary with respect to same-direction transmissions on the two carriers 22 and 24, i.e., times allocated for making scheduled downlink transmissions to the device 20 are non-overlapping in time as between the two carriers 22 and 24, and the same is true for the uplink direction.

If the node 40 is centralized and separate from a given pair of macro and pico base stations 16 and 18, it may send the allocation information to both such base stations, and also possibly to the device 20. If the macro base station 16 is configured to operate as the node 40, then the macro base station 16 may send the allocation information to the pico node 18 and/or to the device 20. Conversely, if the pico node 18 is configured to operate as the node 40, the pico node 18 may send the allocation information to the macro node 16 and/or to the device 20. In support of all such configurations, it will be understood that internode signaling may be exchanged, to share service requirement information, network loading information or other network conditions, which may be considered when determining the TDD arrangement 30 for a given device 20.

In cases where the node 40 is one of macro and pico base stations 16 and 18, it generally will have a scheduling circuit 48 that is configured to schedule downlink and uplink transmissions to and from the device 20 on the first or second carrier 22 or 24 only at times allocated to the first or second carrier 22 or 24 under the TDD arrangement 30. To the extent that the node 40 is using multiple TDD arrangements 30 for respective ones in a plurality of devices 20, the scheduling circuit 48 will be understood to incorporate into its multi-user scheduling decisions the allocations defined by TDD arrangements 30 for those devices 20.

In some embodiments, the allocation processing circuit 46 is configured to update the TDD arrangement 30, as needed, in each one of a series of successive allocation windows 34. Additionally, or alternatively, the allocation processing circuit 46 is configured to determine the TDD arrangement 30 as a function of the relative service requirements for serving the device 20 on the first and second carriers 22 and 24, so that the carrier having higher service requirements for serving the device 20 is allocated more time as compared to the other carrier.

Figure 6:
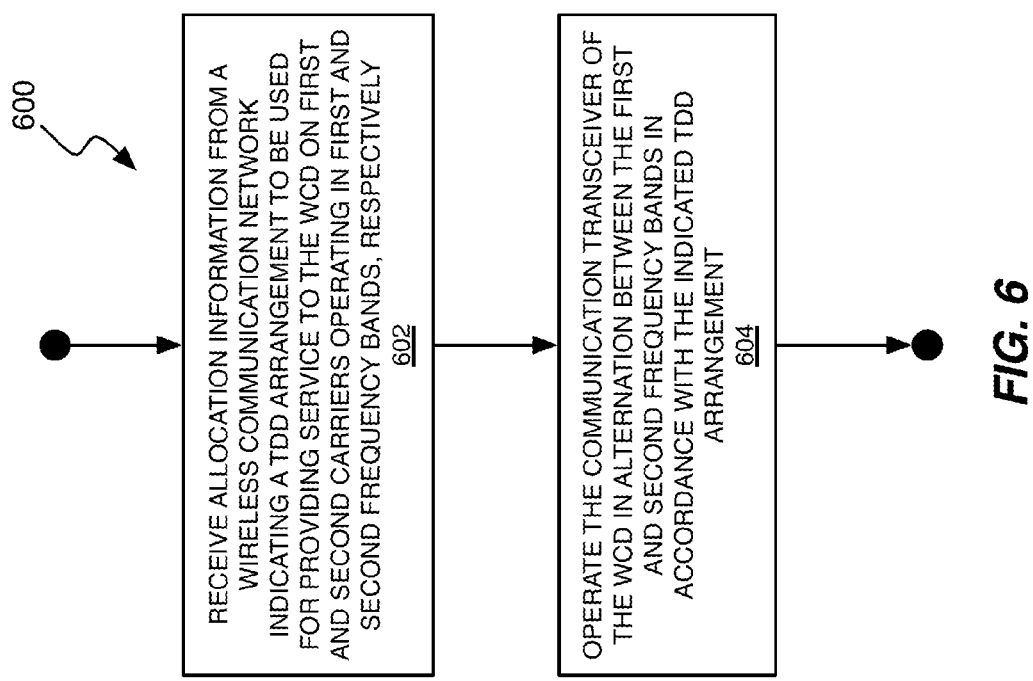
FIG. 6 is a logic flow diagram of one embodiment of a method of operating with aggregated carriers, such as is implemented in a User Equipment (UE) or other wireless communication device.

FIG. 6 illustrates an example of the device-side processing, by setting forth a method 600 implemented at a device 20. The method 600 includes receiving allocation information from a wireless communication network 10 indicating a TDD arrangement 30 to be used for providing service to the device 20 on first and second carriers 22 and 24 operating in first and second frequency bands, respectively (Block 602). The TDD arrangement 30 indicates to the device complementary allocations of time between the two carriers 22 and 24, so that scheduled transmissions to or from the device 20 are mutually exclusive in time as between the two carriers 22 and 24.

Correspondingly, the method 600 includes operating the communication transceiver of the device 20 in alternation between the first and second frequency bands in accordance with the indicated TDD arrangement 30 (Block 604). Here, operating the transceiver in alternation between the first and second frequency bands means alternating both the receiver and transmitter parts in unison between the first and second frequency bands, so that at one time the receiver and transmitter parts are simultaneously tuned to the downlink and uplink in the first frequency band, and at another time they are both tuned to the downlink and uplink in the second frequency band.

However, in another example, operating the transceiver in alternation between the first and second frequency bands means alternating the receiver part between the first and second frequency bands and alternating the transmitter part between the first and second frequency bands, but where at any given time the receiver part may be tuned to the downlink in the first frequency band, while the transmitter part is tuned to the uplink in the second frequency band. Thus, while the receiver and transmitter parts both alternate between the two bands, they do not necessarily both tune to the same band at a time.

In at least some embodiments, the device 20 is configured to use the TDD arrangement 30 for a defined allocation window 34. The same or an updated TDD arrangement 30 may be used by the device in a subsequent allocation window 34. More broadly, in at least one embodiment, the device 20 is configured to adjust the operation of its communication transceiver in response to receiving updated allocation information, so that the alternation of the communication transceiver between the first and second frequency bands is modified according to the updated allocation information.

Figure 7:
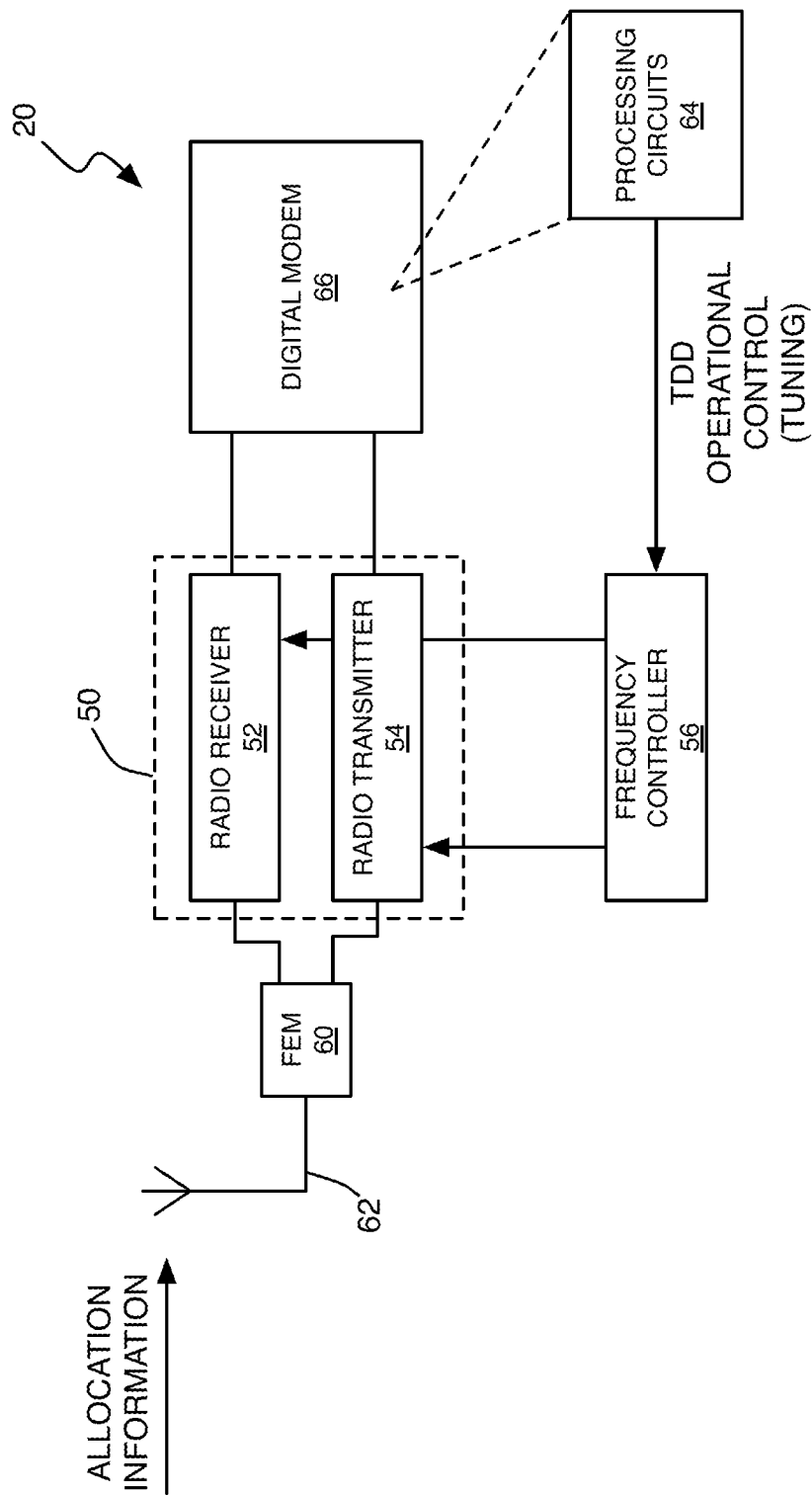
FIG. 7 is a block diagram of one embodiment of a UE or other wireless communication device configured for operation with aggregated carriers.

FIG. 7 illustrates an example configuration for a device 20 configured to implement the above method 600. One sees a communication transceiver 50 configured for FDD operation, meaning that its receiver 52 and transmitter 54 can be operated simultaneously, with the receiver 52 tuned to an uplink frequency and the transmitter 54 tuned to a downlink frequency. The tuning is controlled by a tuning controller 56, which for example sets the Local Oscillator (LO) frequencies used to tune the receiver 52 and the transmitter 56 in response to control signaling from a digital modem 58. It will also be understood that an associated front-end module ("FEM") 60 supports the FDD operation of the receiver 52 and the transmitter 54, to allow the simultaneous reception and transmission of signals from one or more receive/transmit antennas 62.

The device 20 further includes one or more processing circuits 64 that are operatively associated with the communication transceiver 50 and configured to receive allocation information from a wireless communication network 10 indicating a TDD arrangement 30 to be used for providing service to the device 20 on first and second carriers 22 and 24 operating in first and second frequency bands, respectively. The TDD arrangement 30 indicates complementary allocations of time between the two carriers 22 and 24, so that scheduled transmissions to or from the wireless communication device 20 are mutually exclusive in time as between the two carriers 22 and 24.

Thus, the one or more processing circuits 64 are configured to operate the communication transceiver 50 in alternation between the first and second frequency bands in accordance with the indicated TDD arrangement 30, so that the device 20 communicates with the wireless communication network 10 on both carriers 22 and 24 using the same communication transceiver 50. In an example, the one or more processing circuits 64 control the frequency controller 56 so that the receiver 52 is tuned in alternation between the downlink of the first carrier 22 and the downlink of the second carrier 24, in accordance with the respective allocations of downlink times to the first and second carriers 22 and 24 indicated in the TDD arrangement 30. Similarly, the one or more processing circuits 64 would further control the frequency controller 56 so that the transmitter 54 is tuned in alternation between the uplink of the first carrier 22 and the uplink of the second carrier 24, in accordance with the respective allocations of uplink times to the first and second carriers 22 and 24 indicated in the TDD arrangement 30.

It will be understood that the one or more processing circuits 64 may be configured to carry out the method 600 in a number of different ways. The one or more processing circuits 64 may be fixed or programmable, or some mix of fixed and programmable circuitry. For example, a digital modem 66 included in the device 20 may comprise one or more microprocessor circuits, DSP circuits, or other digital processing circuits, that are configured according to their execution of computer program instructions stored in memory or another computer-readable medium in or accessible to the digital modem 66.

The device 20 may be configured according to one or more wireless communication standards. In some embodiments, the device 20 comprises a User Equipment (UE) or other type of communication apparatus configured for operation in a LTE-based wireless communication network, and the network 10 is configured as such an LTE network.

Whether in the LTE context or in another network context, generation and usage of the TDD arrangement 30 offers advantages to a number of service scenarios, not least among them the soft-cell scenario. In a likely soft-cell scenario where one or more pico cells 14 are overlaid by a larger macro cell 12, a first carrier 22 is used to serve the macro layer and a second carrier 24 is used to serve the pico layer, where the two carriers 22 and 24 are operated in different frequency bands to minimize interference between the macro and pico layers.

As the smaller pico cells 14 will carry the data transport for devices 20 within their respective service areas, the amount of traffic in the macro layer for those devices 20 will be much smaller (typically only control and system information will need to be transmitted in the macro layer for these devices 20). If one assumes that the second carrier 24 deployed for the pico layer in the network 10 is a TDD-based carrier (e.g. LTE-Advanced Local Area TDD in 3.5G Hz band), then the half-duplex nature of that link means that the device's transceiver utilization for receive or transmit operations in the pico layer is below one-hundred percent. The TDD arrangement 30 advantageously uses these unused times to handle traffic in the macro layer. Of course, the TDD arrangement 30 may be used when both the pico and macro layers are FDD-based, or where they are both TDD based.

Figure 8:
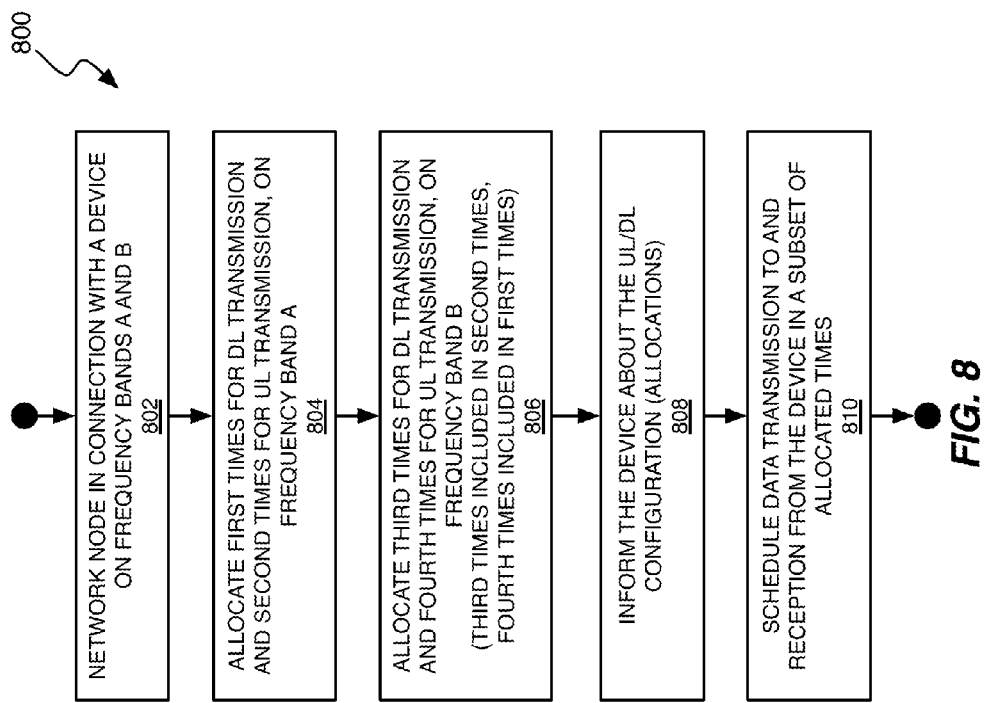
FIG. 8 is a logic flow diagram illustrating further example details for the method introduced in FIG. 4.

FIG. 8 illustrates another method 800, which can be understood as providing further example details for the method 400 introduced in FIG. 4. A network (NW) node 40 is connected on frequency bands A and B to a device 20 (Block 802), e.g., at the Radio Resource Control (RRC) layer or another protocol layer.

The node 40 allocates first times for downlink (DL) transmission to the device 20 and second times for uplink (UL) transmissions from the device 20, for the frequency band A (Block 804). Continuing, the node 40 allocates third times for downlink (DL) transmission to the device 20 and fourth times for uplink (UL) transmissions from the device 20, for the frequency band B (Block 806). Processing continues with informing the device 20 about the UL and DL configurations (Block 808). That is, the node 40 sends allocation information to the device 20, indicating the TDD arrangement 30. Further, the method 800 includes scheduling UL and DL transmissions to the device 20 according to the allocated UL and DL times (Block 810).

This "step" may be understood as being carried out by the node or nodes responsible for scheduling on the two carriers 22 and 24. For example, the macro base station 12 would restrict its scheduling of downlink and uplink transmissions for the device 20 on the first carrier 22 in accordance with the UL and DL times allocated to the macro layer in the TDD arrangement 30. Likewise, the involved pico base station 18 would restrict its scheduling of downlink and uplink transmissions for the device 20 on the second carrier in accordance with the UL and DL times allocated to the pico layer in the TDD arrangement 30.

Further, the above third times can be included in the second times, and the fourth times can be included in the first times. In other words, the first times and the third times are mutually exclusive, to avoid simultaneous downlink transmissions to the device 20 in both frequency bands A and B, and the second and fourth times are likewise mutually exclusive to avoid simultaneous uplink transmissions by the device in both frequency bands A and B. No time overlap is permitted between downlink transmissions to the device 20 on the two carriers 22 and 24, and likewise no time overlap is allowed between uplink transmissions from the device 20 on the two carriers 22 and 24, but downlink transmissions in frequency band A can overlap with uplink transmissions in frequency band B, and vice versa. Thus, assuming that the device's transceiver 50 permits tuning the receiver 52 to one of the frequency bands A or B at the same time the transmitter 54 is tuned to the other one of the frequency bands A or B, the first times need not be mutually exclusive with the fourth times, and the second times need not be mutually exclusive with the third times.

These allocations can be understood as an example TDD arrangement 30 and the "times" at issue here may be LTE subframes. As a known example, the LTE FDD mode uses LTE frames of 10 ms, where each LTE frame is divided into twenty slots.

An LTE subframe spans two such slots and it should be noted that the terms "frame 32" and "frames 32" as used herein are generic in the sense that they are meant to identify some quantum of time that corresponds to a scheduling interval. Thus, it will be understood that the allocation of complementary times between the first and second carriers 22 and 24 made by the TDD arrangement 30 may be a complementary allocation of LTE subframes over a window of time spanning some number of LTE subframes.

In another aspect of the teachings herein, the "robustness" of communications between the network 10 and the device 10 depend on the network 10 being able to communicate with the device 20 using at least one of the carriers 22 and 24. Where the macro layer provides system information and other control signaling for the device 20, it is important for the network 10 to maintain its macro layer connection with the device 20. Hence, the TDD arrangement 30 may be generated in such a way that the macro layer is allocated some minimum number of times for uplink and/or downlink transmissions between the network 10 and the device 20 on the macro layer, and the guarantee may also control the maximum permissible scheduling gap allowed between allocated times. In an LTE example, this means guaranteeing a certain number and/or spacing of allocated LTE subframes to the macro layer to insure communication robustness.

If the device 20 detects it has lost connection on the pico layer (as would happen when it is not within any of the pico cells 14), it could tune its receiver 52 to monitor macro layer transmissions even in the LTE subframes that are allocated to the pico layer according to the currently-controlling TDD arrangement 30. Further, the network 10 can detect this situation, e.g., by the absence of corresponding ACK/NAK or Channel State Information (CSI) reports from the device 20. In a scenario where the pico layer is preferentially used to transmit user traffic to the device 20 and the network 10 detects a loss of connection to the device 20, the network 10 can then switch user traffic transmissions for the device 20 to the macro layer.

Broadly, the teachings herein use intelligent time allocation and scheduling that time-wise orthogonalizes downlink transmissions to a device 20 on first and second carriers 22 and 24 operating in first and second frequency bands, and likewise orthogonalizes the uplink transmissions from the device 20 on the two carriers 22 and 24. The TDD arrangement 30 embodying the intelligent time allocations allows the same receiver 52 within the device 20 to receive transmissions (at different times) on the downlinks of both carriers 22 and 24, while not requiring the device 20 to simultaneously receive in both frequency bands. Likewise, the TDD arrangement 30 allows the same transmitter 54 within the device 20 to send transmissions (at different times) on the uplinks of both carriers 22 and 24, while not requiring the device 20 to simultaneously transmit in both frequency bands.

Correspondingly, the TDD arrangement 30 is known to the network nodes responsible for scheduling transmissions to or from the device 20 on the two carriers 22 and 24, and the scheduling processes ongoing in such nodes are configured to consider the TDD arrangement 30 when making scheduling decisions, so that scheduled transmissions and receptions on each carrier 22 and 24 occur at times allocated under the TDD arrangement 30.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of allowing synchronized first and second carriers operating in respective first and second frequency bands to share in time a transceiver of a wireless communication device for carrier aggregation, said method comprising:
   determining a Time Division Duplex (TDD) arrangement for the two carriers by making complementary allocations of time between the two carriers, so that scheduled same-direction transmissions to or from the wireless communication device are mutually exclusive in time as between the two carriers; and
   sending allocation information indicating the TDD arrangement to at least one of the wireless communication device and a network node responsible for scheduling uplink and downlink transmissions on at least one of the two carriers.

2. The method of claim 1, further comprising scheduling downlink and uplink transmissions to and from the wireless communication device on the first or second carrier only at times allocated to the first or second carrier under the TDD arrangement.

3. The method of claim 1, wherein said steps of determining and sending are performed in each of a series of successive allocation windows, each said allocation window spanning a number of frames, so that the division of frames between the first and second carriers is dynamically updated over the successive allocation windows in response to changing service requirements for the wireless communication device on the first and second carriers.

4. The method of claim 1, wherein the first carrier is a FDD carrier and the second carrier is a TDD carrier, and wherein the TDD arrangement imposes a TDD-based usage of the FDD carrier with respect to the wireless communication device.

5. The method of claim 1, wherein the first carrier serves a macro cell operating in a soft-cell arrangement with an underlaid pico cell that is served by the second carrier, and wherein the method is performed in one or both of a macro base station corresponding to the macro cell and a pico base station corresponding to the pico cell.

6. The method of claim 1, wherein said step of sending the allocation information comprises sending signaling from a first base station associated with the first carrier to a second base station associated with the second carrier, said signaling indicating the TDD arrangement as determined by the first base station.

7. The method of claim 1, further comprising determining the TDD arrangement as a function of relative service requirements for serving the wireless communication device on the first and second carriers, so that the carrier having higher service requirements for serving the wireless communication device receives a greater allocation of time as compared to the allocation of time given to the other carrier.

8. A network node for use in a wireless communication network that provides communication services to wireless communication devices, said network node comprising:
   one or more communication interfaces; and
   an allocation processing circuit operatively associated with the one or more communication interfaces and configured to allow synchronized first and second carriers operating in respective first and second frequency bands to share in time the transceiver of a wireless communication device for carrier aggregation, based on said allocation processing circuit being configured to:
      determine a Time Division Duplex (TDD) arrangement for the two carriers by making complementary allocations of time between the two carriers, so that scheduled same-direction transmissions to or from the wireless communication device are mutually exclusive in time as between the two carriers; and
      send allocation information indicating the TDD arrangement to at least one of the wireless communication device and a network node responsible for scheduling uplink and downlink transmissions on at least one of the two carriers.

9. The network node of claim 8, further comprising a scheduling circuit configured to schedule downlink and uplink transmissions to and from the wireless communication device on the first or second carrier only at times allocated to the first or second carrier under the TDD arrangement.

10. The network node of claim 8, wherein the allocation processing circuit is configured to update the TDD arrangement as needed, in each one of a series of successive allocation windows, each said allocation window spanning a number of frames defining transmission times on the first and second carriers, such that the TDD arrangement divides the frames within each defined allocation window between the first and second carriers.

11. The network node of claim 8, wherein the first carrier serves a macro cell operating in a soft-cell arrangement with an overlaid pico cell that is served by the second carrier, and wherein the network node comprises:
- a centralized node configured for communications directly or indirectly with a macro base station associated with the macro cell and a pico base station associated with the pico cell; or
- the macro or pico base station.

12. The network node of claim 8, wherein the first carrier is a FDD carrier and the second carrier is a TDD carrier, and wherein the TDD arrangement imposes a TDD-based usage of the FDD carrier with respect to the wireless communication device.

13. The network node of claim 8, wherein the network node comprises a first base station associated with the first carrier, and wherein the allocation processing circuit is configured to cooperate with the one or more communication interfaces to send signaling indicating the TDD arrangement from the first base station to a second base station associated with the second carrier.

14. The network node of claim 8, wherein the allocation processing circuit is configured to determine the TDD arrangement as a function of relative service requirements for serving the wireless communication device on the first and second carriers, so that the carrier having higher service requirements for serving the wireless communication device is allocated more time as compared to the other carrier.

15. A wireless communication device comprising:
- a communication transceiver configured for Frequency Duplex Division (FDD) operation; and
- one or more processing circuits that are operatively associated with the communication transceiver and configured to:
  - receive allocation information from a wireless communication network indicating a Time Division Duplex (TDD) arrangement to be used for providing service to the wireless communication device on first and second carriers operating in first and second frequency bands, respectively, wherein the TDD arrangement indicates complementary allocations of time between the two carriers, so that scheduled same-direction transmissions to or from the wireless communication device are mutually exclusive in time as between the two carriers; and
  - operate the communication transceiver in alternation between the first and second frequency bands in accordance with the indicated TDD arrangement, so that the wireless communication device communicates with the wireless communication network on both carriers using the same communication transceiver.

16. The wireless communication device of claim 15, wherein the wireless communication device is configured for operation in a Long Term Evolution (LTE) based wireless communication network.

17. The wireless communication device of claim 15, wherein one or more processing circuits are configured to use the allocation information for a defined allocation window.

18. The wireless communication device of claim 15, wherein the one or more processing circuits are configured to adjust operation of the communication transceiver in response to receiving updated allocation information, so that the alternation of the communication transceiver between the first and second frequency bands is adjusted according to the updated allocation information.

19. The wireless communication device of claim 15, wherein the one or more processing circuits are configured to operate said transceiver in alternation between the first and second frequency bands such that a transmitter and a receiver of the transceiver alternate in time between the first and second frequency bands, so that at any given time, the receiver is tuned to one of the frequency bands and the transmitter is tuned to the other one of the frequency bands.

20. A method of operating a wireless communication device comprising:
- receiving allocation information from a wireless communication network indicating a Time Division Duplex (TDD) arrangement to be used for providing service to the wireless communication device on first and second carriers operating in first and second frequency bands, respectively, wherein the TDD arrangement indicates complementary allocations of time between the two carriers, so that scheduled same-direction transmissions to or from the wireless communication device are mutually exclusive in time as between the two carriers; and
- operating the communication transceiver in alternation between the first and second frequency bands in accordance with the indicated TDD arrangement, so that the wireless communication device communicates with the wireless communication network on both carriers using the same communication transceiver.

21. The method of claim 20, wherein the wireless communication device is configured for operation in a Long Term Evolution (LTE) based wireless communication network.

22. The method of claim 20, further comprising using the allocation information for a defined allocation window.

23. The method of claim 20, further comprising adjusting the operation of the communication transceiver in response to receiving updated allocation information, so that the alternation of the communication transceiver between the first and second frequency bands is modified according to the updated allocation information.

24. The method of claim 20, wherein operating the transceiver in alternation between the first and second frequency bands comprises alternating a transmitter and a receiver of the transceiver between operation in the first frequency band and operation in the second frequency band, so that at any given time, the receiver is tuned to one of the frequency bands and the transmitter is tuned to the other one of the frequency bands.

* * * * *